US012785278B2

(12) United States Patent
Jong et al.

(10) Patent No.: US 12,785,278 B2
(45) Date of Patent: Nov. 3, 2026

(54) ANTENNA AND ELECTRONIC DEVICE COMPRISING SAME

(71) Applicant: Samsung Electronics Co., Ltd., Suwon-si (KR)

(72) Inventors: Jehun Jong, Suwon-si (KR); Hosaeng Kim, Suwon-si (KR); Seongjin Park, Suwon-si (KR); Sumin Yun, Suwon-si (KR); Woomin Jang, Suwon-si (KR); Jaehoon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 18/638,035

(22) Filed: Apr. 17, 2024

(65) Prior Publication Data

US 2024/0266742 A1 Aug. 8, 2024

Related U.S. Application Data

(63) Continuation of application No. PCT/KR2022/014417, filed on Sep. 27, 2022.

(30) Foreign Application Priority Data

Oct. 18, 2021 (KR) ........................ 10-2021-0138395

(51) Int. Cl.
*H01Q 9/04* (2006.01)
*H01Q 1/24* (2006.01)
*H01Q 3/30* (2006.01)

(52) U.S. Cl.
CPC ........... *H01Q 9/0407* (2013.01); *H01Q 1/241* (2013.01); *H01Q 3/30* (2013.01)

(58) Field of Classification Search
None
See application file for complete search history.

(56) References Cited

U.S. PATENT DOCUMENTS

2007/0194999 A1 8/2007 Morton
2010/0311356 A1* 12/2010 Rofougaran ............ G01S 13/06 345/173

(Continued)

FOREIGN PATENT DOCUMENTS

JP 2002-151945 A2 5/2002
KR 10-1393280 B1 5/2014

(Continued)

OTHER PUBLICATIONS

International Search Report dated Jan. 12, 2023, issued in International Patent Application No. PCT/KR2022/014417.

(Continued)

*Primary Examiner* — Crystal L Hammond
(74) *Attorney, Agent, or Firm* — Jefferson IP Law, LLP

(57) ABSTRACT

An electronic device is provided. The electronic device includes a housing, a display panel arranged so as to be visible from the outside through at least a portion of the housing in the inner space of the housing, a dielectric sheet disposed between the display panel and the housing and at least partially including a ground region, at least one mesh pattern disposed to be at least partially electrically connected to the ground region and formed in a patch shape using a plurality of conductive lines, and a wireless communication circuit configured to transmit or receive a wireless signal in a designated frequency band through the at least one mesh pattern, wherein a slot is formed to have a length in a first direction in at least a portion of the at least one mesh pattern or at least a portion of the ground area, and the at least one mesh pattern may be electrically connected to the wireless communication circuit through at least one power supply line disposed across the ground region and at least one slot along a second direction crossing the first direction.

20 Claims, 16 Drawing Sheets

(56) References Cited

U.S. PATENT DOCUMENTS

| | | | | |
|---|---|---|---|---|
| 2014/0253400 | A1 | 9/2014 | Tiezzi et al. | |
| 2016/0093939 | A1 | 3/2016 | Kim et al. | |
| 2016/0190678 | A1 | 6/2016 | Hong et al. | |
| 2019/0058264 | A1 | 2/2019 | Jung et al. | |
| 2021/0013626 | A1* | 1/2021 | Jang | H01Q 1/2258 |
| 2021/0028556 | A1 | 1/2021 | Brar et al. | |
| 2022/0276682 | A1 | 9/2022 | Yu et al. | |
| 2022/0278445 | A1 | 9/2022 | Woo | |
| 2023/0155279 | A1 | 5/2023 | Choi et al. | |

FOREIGN PATENT DOCUMENTS

| | | | |
|---|---|---|---|
| KR | 10-2016-0036436 | A | 4/2016 |
| KR | 10-2016-0080444 | A | 7/2016 |
| KR | 10-2019-0019802 | A | 2/2019 |
| KR | 10-2039398 | B1 | 10/2019 |
| KR | 10-2056173 | B1 | 12/2019 |
| KR | 10-2021-0007526 | A | 1/2021 |
| KR | 10-2204410 | B1 | 1/2021 |
| KR | 10-2021-0111614 | A | 9/2021 |
| WO | 2021/033806 | A1 | 2/2021 |
| WO | 2021-147945 | A1 | 7/2021 |
| WO | 2021/201323 | A1 | 10/2021 |

OTHER PUBLICATIONS

Extended European Search Report dated Dec. 10, 2024, issued in European Application No. 22883805.8-1201.

Korean Office Action dated Jan. 2, 2026, issued in Korean Application No. 10-2021-0138395.

* cited by examiner

ANTENNA AND ELECTRONIC DEVICE COMPRISING SAME

CROSS-REFERENCE TO RELATED APPLICATION(S)

This application is a continuation application, claiming priority under § 365(c), of an International application No. PCT/KR2022/014417, filed on Sep. 27, 2022, which is based on and claims the benefit of a Korean patent application number 10-2021-0138395, filed on Oct. 18, 2021, in the Korean Intellectual Property Office, the disclosure of which is incorporated by reference herein in its entirety.

BACKGROUND

1. Field

The disclosure relates to an antenna and an electronic device including the same.

2. Description of Related Art

With the development of wireless communication technology, electronic devices (e.g., electronic devices for communication) are commonly used in daily life, and the use of content due to this tends to increase. Due to the rapid increase in the use of content, the network capacity is gradually reaching its limit, and after the commercialization of a 4th generation (4G) communication system, research has been conducted on a communication system (e.g., 5th generation (5G), pre-5G communication system, or new radio (NR)) that at least one of transmits or receives a signal using a frequency of a high-frequency (e.g., mmWave) band (e.g., 3 gigahertz (GHz) to 300 GHz bands) to meet the increasing demand for wireless data traffic.

The above information is presented as background information only to assist with an understanding of the disclosure. No determination has been made, and no assertion is made, as to whether any of the above might be applicable as prior art with regard to the disclosure.

SUMMARY

An electronic device may include an antenna (e.g., mmWave antenna) capable of transmitting and receiving signals by using frequencies within a designated range (e.g., frequencies within a range of about 3 GHz to about 300 GHz). Antennas are being developed in various shapes to overcome a high free space loss due to frequency characteristics thereof, implement efficient mounting structures for increasing gains, and conform to the efficient mounting structures. For example, the antenna includes an antenna array made by disposing a plurality of antenna elements (e.g., a plurality of conductive patterns and/or a plurality of conductive patches) on a substrate. The antenna elements may be disposed in the electronic device to form directional beams in at least any one direction.

In case that a display including a conductive layer (e.g., a metal sheet layer or a touch layer) occupies the most part of a front surface of the electronic device, it is difficult for the antenna to radiate beams in a front surface direction in which the display is directed. In order to solve this difficulty, the antenna may include a display antenna disposed between a display panel and a front surface plate (e.g., a window layer or a front surface cover) and configured to form directional beams in the front surface direction in which the display is directed. In this case, the display antenna may include at least one conductive mesh pattern formed by disposing a plurality of conductive lines on a dielectric sheet disposed between the display panel and the front surface plate. These conductive mesh patterns used for the antenna may form directional beams in the front surface direction and assist in ensuring visibility of the display.

For example, the display antenna is supplied with power through electric supply lines extending from a non-display area to the conductive mesh patterns. The electric supply line may be attached to an edge area of the dielectric sheet and/or the dielectric sheet and extend to a flexible substrate electrically connected to the substrate of the electronic device.

However, because there is a remarkable difference in conductivity between a solid area of the electric supply line and a mesh pattern area defined by the conductive lines, an electric current may be remarkably decreased by high resistance of a mesh pattern portion, and radiation performance of the antenna may deteriorate. In addition, the electronic device may have difficulty increasing current consumption to improve the radiation performance of the antenna.

Aspects of the disclosure are to address at least the above-mentioned problems and/or disadvantages and to provide at least the advantages described below. Accordingly, an aspect of the disclosure is to provide antennas disposed on an upper portion of a display while overlapping one another, and an electronic device including the same.

Another aspect of the disclosure is to provide an antenna capable of assisting in improving radiation performance by changing a structure of a mesh pattern without increasing current consumption, and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a display panel disposed in an internal space of the housing so as to be visible from the outside through at least a part of the housing, a dielectric sheet disposed between the display panel and the housing and at least partially including a ground area, at least one mesh pattern disposed to be at least partially electrically connected to the ground area and formed in a patch shape by a plurality of conductive lines, and a wireless communication circuit configured to transmit or receive a radio signal in a designated frequency band through the at least one mesh pattern, in which at least a part of the at least one mesh pattern or at least a part of the ground area includes a slot formed to have a length in a first direction, and in which the at least one mesh pattern is electrically connected to the wireless communication circuit through at least one electric supply line disposed while traversing the ground area and at least one slot in a second direction intersecting the first direction.

In accordance with another aspect of the disclosure, an antenna is provided. The antenna includes a dielectric sheet at least partially including a ground area, at least one mesh pattern disposed to be at least partially electrically connected to the ground area and formed in a patch shape by a plurality of conductive lines, a slot formed in at least a part of the at least one mesh pattern or at least a part of the ground area and having a length in a first direction, and at least one electric supply line disposed while traversing the ground area and the at least one slot in a second direction intersecting the first direction.

According to the antenna according to the embodiments of the disclosure, the slot antenna area, which is formed by the slot formed in a part of the at least one mesh pattern, is formed on the portion of the at least one electric supply line, such that it is possible to eliminate imbalance of conductivity, which occurs in the boundary area between the at least one electric supply line and the at least one mesh pattern, reduce resistance, and assist in improving the radiation performance without increasing an electric current.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
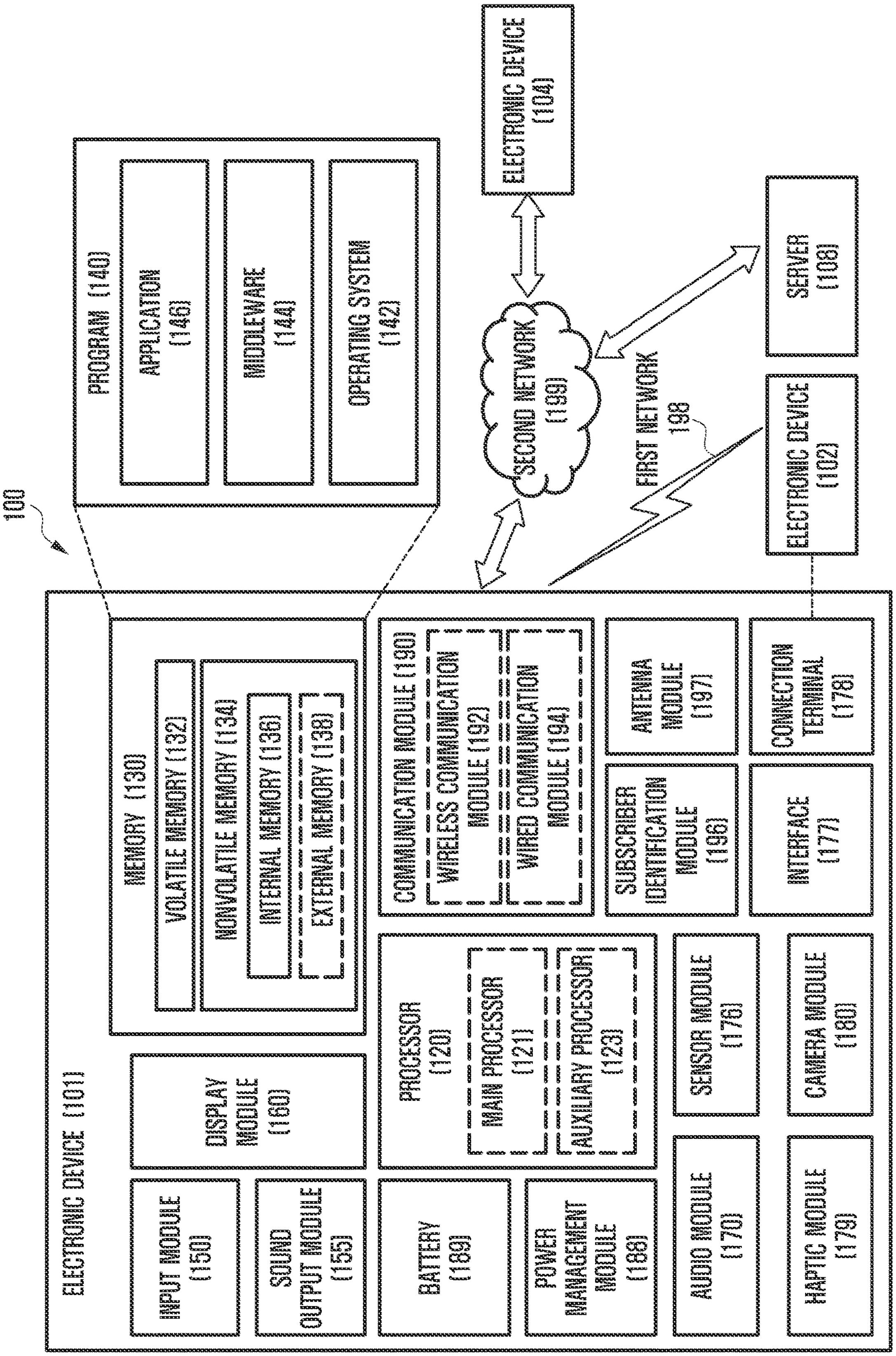
FIG. 1 is a block diagram of an electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) is implemented as embedded in the display device 160 (e.g., a display).

The processor 120 may execute, for example, software (e.g., a program 140) to control at least one other component (e.g., a hardware or software component) of the electronic device 101 coupled with the processor 120, and performs various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data includes, for example, software (e.g., the program 140) and input data or output data for a command related thereto. The memory 130 may include the volatile memory 132 or the non-volatile memory 134. the non-volatile memory 134 may include internal memory 136 and external memory 138.

The program 140 may be stored in the memory 130 as software, and includes, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 includes, for example, a microphone, a mouse, a keyboard, or a digital pen (e.g., a stylus pen).

The audio output module 155 may output sound signals to the outside of the electronic device 101. The audio output module 155 includes, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 includes, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 includes, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 includes, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 includes, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 is implemented as at least part of, for example, a power management integrated circuit (PMIC).

The battery 189 may supply power to at least one component of the electronic device 101. The battery 189 includes, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to another embodiment, the antenna module 197 may include an antenna including a radiating element including a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, is selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to various embodiments, the antenna module 197 may form a mmWave antenna module. According to yet another embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to yet another embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology is used, for example. The electronic device 101 may provide ultra low-latency services using, e.g., distributed computing or mobile edge computing. In yet another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
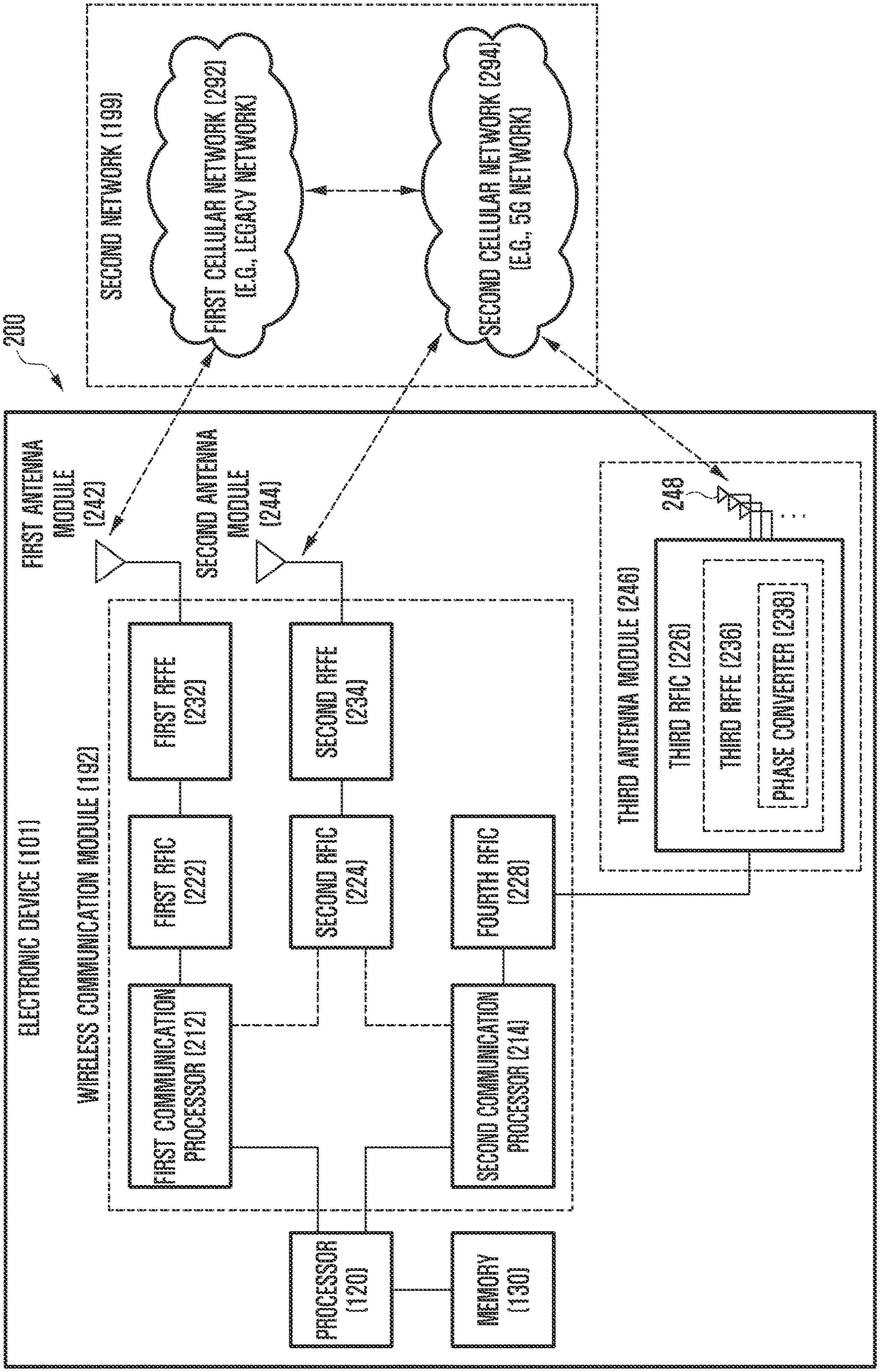
FIG. 2 is a block diagram of the electronic device for supporting legacy network communication and 5G network communication according to an embodiment of the disclosure.

FIG. 2 is a block diagram illustrating an example configuration of an electronic device in a network environment including a plurality of cellular networks according to an embodiment of the disclosure.

Referring to FIG. 2, the electronic device 101 a network environment 200 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and memory 130. A second network 199 may include a first cellular network 292 and a second cellular network 294. According to an embodiment, the electronic device 101 may further include at least one of the components described with reference to FIG. 1, and the second network 199 may further include at least one other network. According to another embodiment, the first communication processor 212, second communication processor 214, first RFIC 222, second RFIC 224, fourth RFIC 228, first RFFE 232, and second RFFE 234 may form at least part of the wireless communication module 192. According to yet another embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), third generation (3G), 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in third generation partnership project (3GPP). Additionally, according to yet another embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to yet another embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 is disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween may be reduced. This reduces, for example, a loss (e.g., attenuation) of a signal of a high frequency band (e.g., about 6 GHz to about 60 GHz)

to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 includes a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
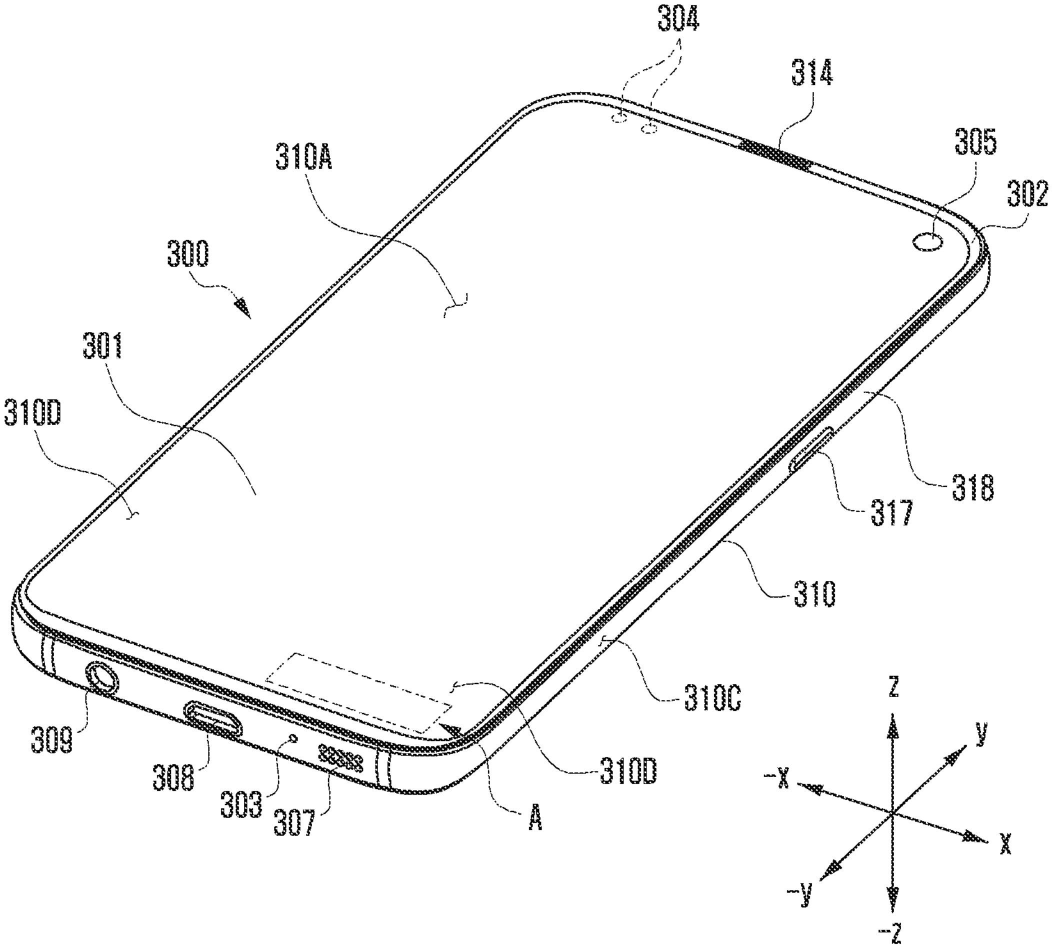
FIG. 3A is a perspective view of a mobile electronic device according to an embodiment of the disclosure.

FIG. 3A is a perspective view of a front surface of an electronic device according to an embodiment of the disclosure.

Figure 3B:
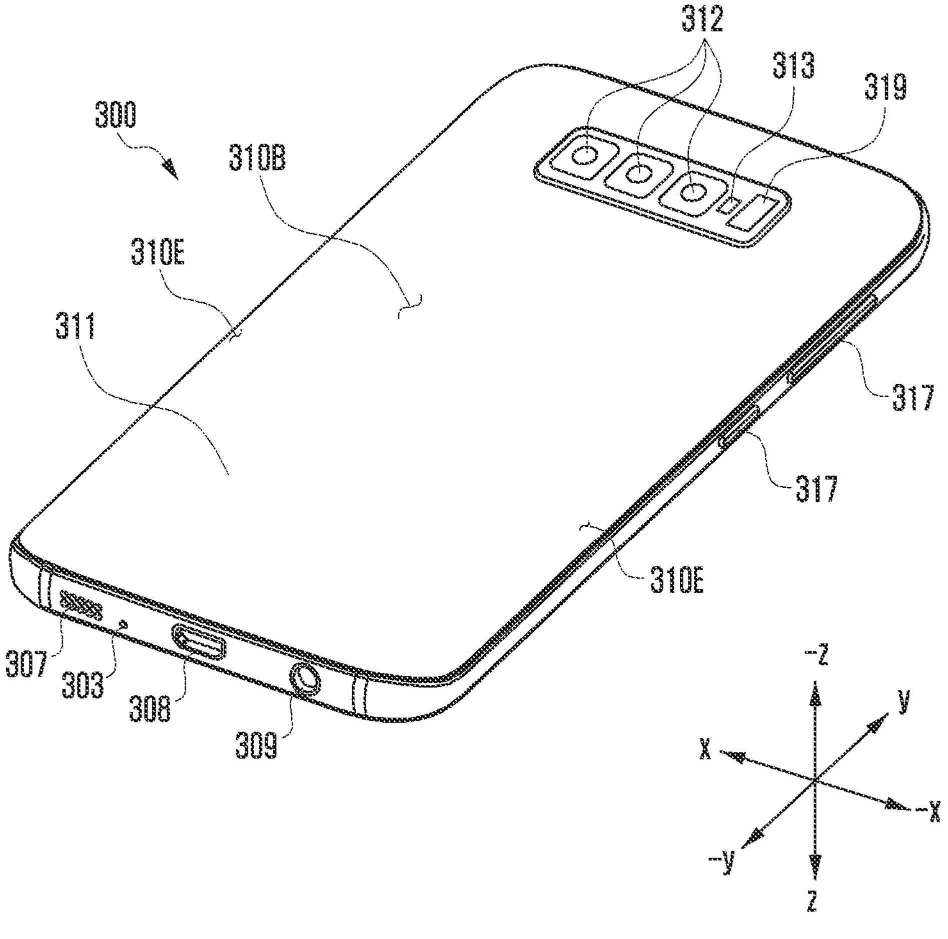
FIG. 3B is a rear perspective view of a mobile electronic device according to an embodiment of the disclosure.

FIG. 3B is a perspective view of a rear surface of the electronic device in FIG. 3A according to an embodiment of the disclosure.

An electronic device 300 in FIGS. 3A and 3B may be at least partially similar to the electronic device 101 in FIG. 1 or include other embodiments of the electronic device.

Referring to FIGS. 3A and 3B, the electronic device 300 according to the embodiment may include a housing 310 including a first surface (or front surface) 310A, a second surface (or rear surface) 310B, and a side surface 310C configured to surround a space between the first surface 310A and the second surface 310B. In another embodiment (not illustrated), the housing 310 may refer to a structure that defines some of the first surface 310A, the second surface 310B, and the side surface 310C in FIG. 1. According to the embodiment, at least a part of the first surface 310A may be defined by a substantially transparent front surface plate 302 (e.g., a glass or polymer plate including various coating layers). The second surface 310B may be defined by a substantially opaque rear surface plate 311. For example, the rear surface plate 311 is made of coated or tinted glass, ceramic, polymer, metal (e.g., aluminum, stainless steel (STS), or magnesium), or a combination of at least two of the above materials. The side surface 310C may be defined by a side surface bezel structure (or a "lateral member") 318 coupled to the front surface plate 302 and the rear surface plate 311 and containing metal and/or polymer. In any embodiment, the rear surface plate 311 and side surface bezel structure 318 may be integrated and contain the same material (e.g., a metallic material such as aluminum).

In the illustrated embodiment, the front surface plate 302 may include first areas 310D extending seamlessly while being bent from the first surface 310A toward the rear surface plate 311 and disposed at two opposite ends of long edges of the front surface plate 302. In the illustrated embodiment (see FIG. 3B), the rear surface plate 311 may include second areas 310E extending seamlessly while being bent from the second surface 310B toward the front surface plate 302 and disposed at the two opposite ends of the long edge. In any embodiment, the front surface plate 302 or the rear surface plate 311 may include only one of the first area 310D and the second area 310E. In any embodiment, the front surface plate 302 may include only a flat surface, which is disposed in parallel with the second surface 310B, without including the first area 310D and the second area 310E. In the embodiments, when viewed from the side surface of the electronic device 300, the side surface bezel structure 318 may have a first thickness (or width) at the side surface side at which the first area 310D or the second area 310E is excluded, and the side surface bezel structure 318 may have a second thickness, which is smaller than the first thickness, at the side surface side at which the first area or the second area is included.

According to the embodiment, the electronic device 300 may include at least one of a display 301, an input device 303, sound output devices 307 and 314, sensor modules 304 and 319, camera modules 305, 312, and 313, a key input device 317, an indicator (not illustrated), and connectors 308 and 309. In any embodiment, the electronic device 300 may exclude at least one (e.g., the key input device 317 or the indicator) of the constituent elements or further include other constituent elements.

For example, the display 301 is exposed through the most part of the front surface plate 302. In any embodiment, at least a part of the display 301 may be exposed through the front surface plate 302 that defines the first area 310D of the side surface 310C and the first surface 310A. The display 301 may be coupled to or disposed adjacent to a touch detection circuit, a pressure sensor configured to measure intensity (pressure) of touch and/or a digitizer configured to detect a stylus pen that operates in a magnetic field manner. In any embodiment, at least a part of each of the sensor modules 304 and 319 and/or at least a part of the key input device 317 may be disposed in the first area 310D and/or the second area 310E.

The input device 303 may include a microphone 303. In the embodiment, the input device 303 may include a plurality of microphones 303 disposed to detect a direction of sound. The sound output devices 307 and 314 may include speakers 307 and 314. The speakers 307 and 314 may include an external speaker 307 and a telephone receiver 314. In any embodiment, the microphones 303, the speakers 307 and 314, and the connectors 308 and 309 may be disposed in the space of the electronic device 300 and exposed to an external environment through at least one hole formed in the housing 310. In any embodiment, the hole formed in the housing 310 may be used in common for the microphone 303 and the speakers 307 and 314. In any embodiment, the sound output devices 307 and 314 may include a speaker (e.g., a piezoelectric speaker) that operates without the hole formed in the housing 310.

The sensor modules 304 and 319 may generate electrical signals or data values corresponding to an internal operating state of the electronic device 300 or the external environment state. For example, the sensor modules 304 and 319 includes a first sensor module 304 (e.g., a proximity sensor) and/or a second sensor module (not illustrated) (e.g., a fingerprint sensor) is disposed on the first surface 310A of the housing 310, and/or a third sensor module 319 (e.g., an HRM sensor) disposed on the second surface 310B of the housing 310. The fingerprint sensor may be disposed on the first surface 310A of the housing 310. The fingerprint sensor (e.g., an ultrasonic sensor or an optical fingerprint sensor) may be disposed below the display 301 on the first surface 310A. The electronic device 300 may further include at least one of various non-illustrated other sensor modules, e.g., a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, and an illuminance sensor 304.

The camera modules 305, 312, and 313 may include a first camera device 305 disposed on the first surface 310A of the electronic device 300, a second camera device 312 disposed on the second surface 310B, and/or a flash 313. The camera modules 305 and 312 may include one or a plurality of lenses, an image sensor, and/or an image signal processor. For example, the flash 313 includes a light-emitting diode or a xenon lamp. In any embodiment, the two or more lenses (wide angle and telephoto lenses) and the image sensors may be disposed on one surface of the electronic device 300.

The key input device 317 may be disposed on the side surface 310C of the housing 310. In another embodiment, the electronic device 300 may exclude some or all of the above-mentioned key input devices 317, and the excluded key input device 317 may be implemented as other types such as a soft key on the display 301. In another embodiment, the key input device 317 may be implemented by using a pressure sensor included in the display 301.

For example, the indicator is disposed on the first surface 310A of the housing 310. For example, the indicator provides status information on the electronic device 300 in the form of light. In another embodiment, for example, the light-emitting element provides a light source that operates in conjunction with an operation of the camera module 305. For example, the indicator includes an LED, an IR LED, and a xenon lamp.

The connectors 308 and 309 may include a first connector 308 capable of accommodating a connector (e.g., a USB connector or an interface connector port module (IF module)) for transmitting or receiving electric power and/or data to or from the external electronic device, and/or a second connector hole (or an earphone jack) 309 capable of accommodating a connector for transmitting or receiving an audio signal to or from the external electronic device.

Some (the camera module 305) of the camera modules 305 and 312, some (the sensor module 304) of the sensor modules 304 and 319, or the indicator may be disposed to be exposed through the display 101. For example, the camera module 305, the sensor module 304, or the indicator is disposed in the internal space of the electronic device 300 so as to adjoin the external environment through an opening or transmissive area formed to the front surface plate 302 of the display 301. According to one embodiment, an area of the display 201, which faces the camera module 205, is a part of the area for displaying content and may define a transmissive area having a predetermined transmittance rate. According to one embodiment, the transmissive area may be formed to have a transmittance rate within a range of about 5% to about 20%. The transmissive area may include an area that overlaps an effective area (e.g., a view angle area) of the camera module 205 through which light, which enters an image sensor to create an image, passes. For example, the transmissive area of the display 201 includes an area having a lower pixel density than the periphery thereof. For example, the transmissive area is substituted with the opening. For example, the camera module 205 includes a under display camera (UDC). In another embodiment, some of the sensor modules 304 may be disposed in the internal space of the electronic device to perform the functions thereof without being visually exposed through the front surface plate 302. For example, in this case, an area of the display 301, which faces the sensor module, does not require the opening.

Figure 5A:
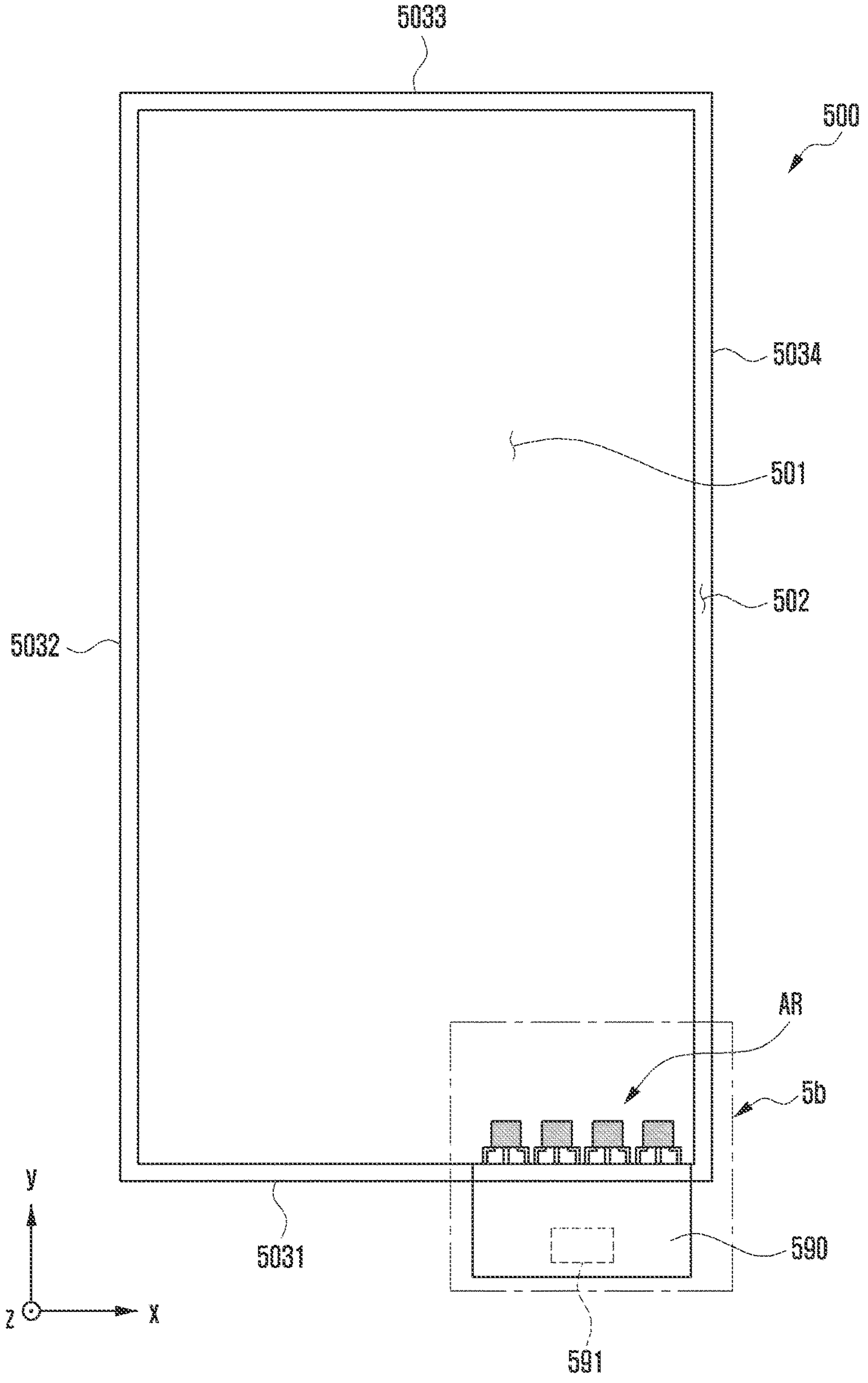
FIG. 5A is a configuration view of a dielectric sheet according to an embodiment of the disclosure.
Figure 5B:
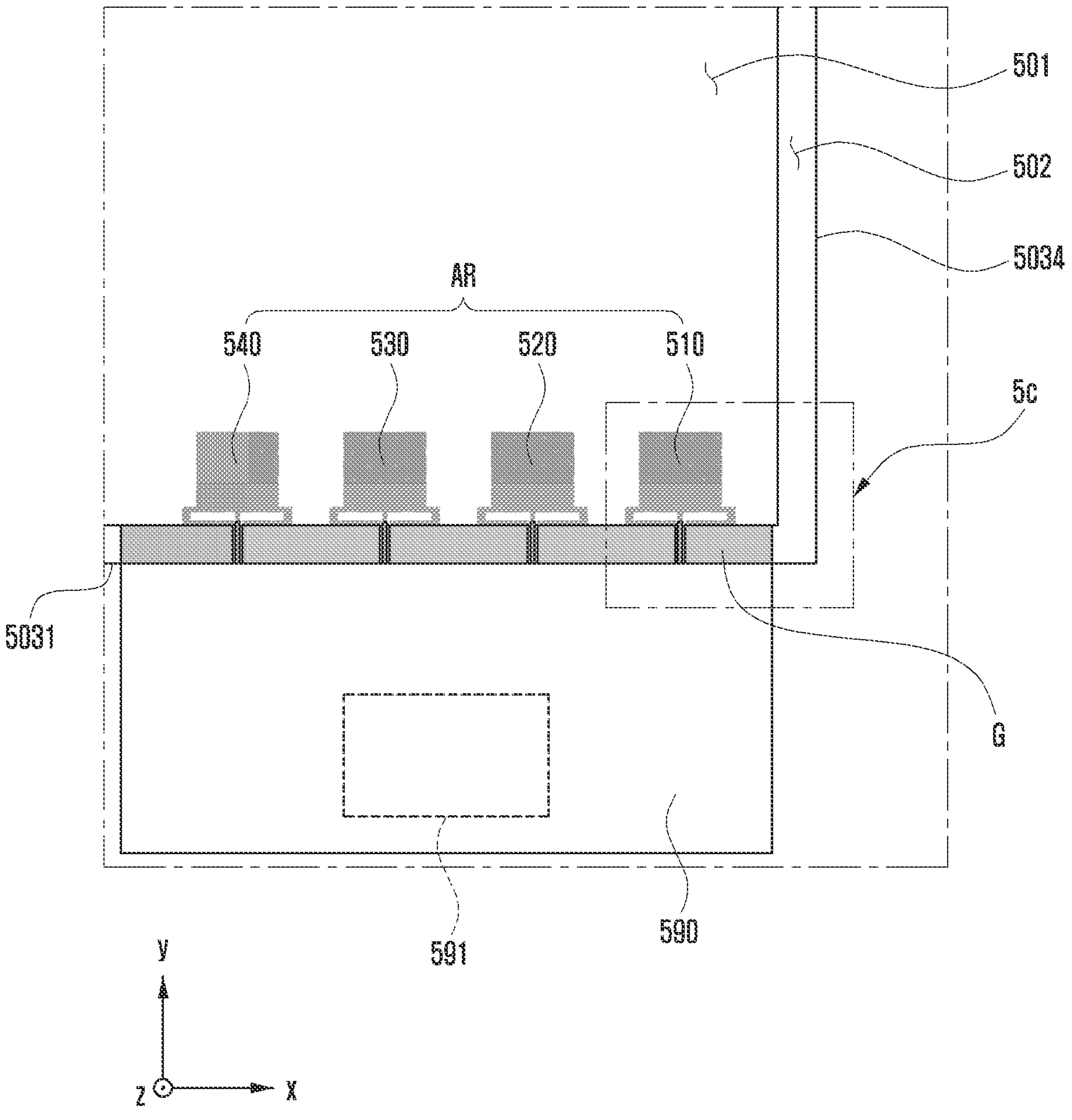
FIG. 5B is an enlarged view of area 5*b* in FIG. 5A according to an embodiment of the disclosure.

According to various embodiments, the electronic device 300 may include an antenna A (e.g., an antenna array AR in FIG. 5A) including at least one antenna element (e.g., mesh patterns 510, 520, 530, and 540 in FIG. 5B). According to one embodiment, the antenna A may be provided in the internal space of the electronic device 300 and disposed in an area that at least partially overlaps the display 301 when viewed from above the display 301. The antenna A may be disposed to form directional beams in a direction (Z-axis direction) in which the display 301 is directed. According to one embodiment, the antenna A is disposed at a right side of a lower end of the first surface 310A of the electronic device 300, as illustrated. However, the antenna A may be disposed at a left side of the lower end, a right side of an upper end, or a left side of the upper end.

Figure 3C:
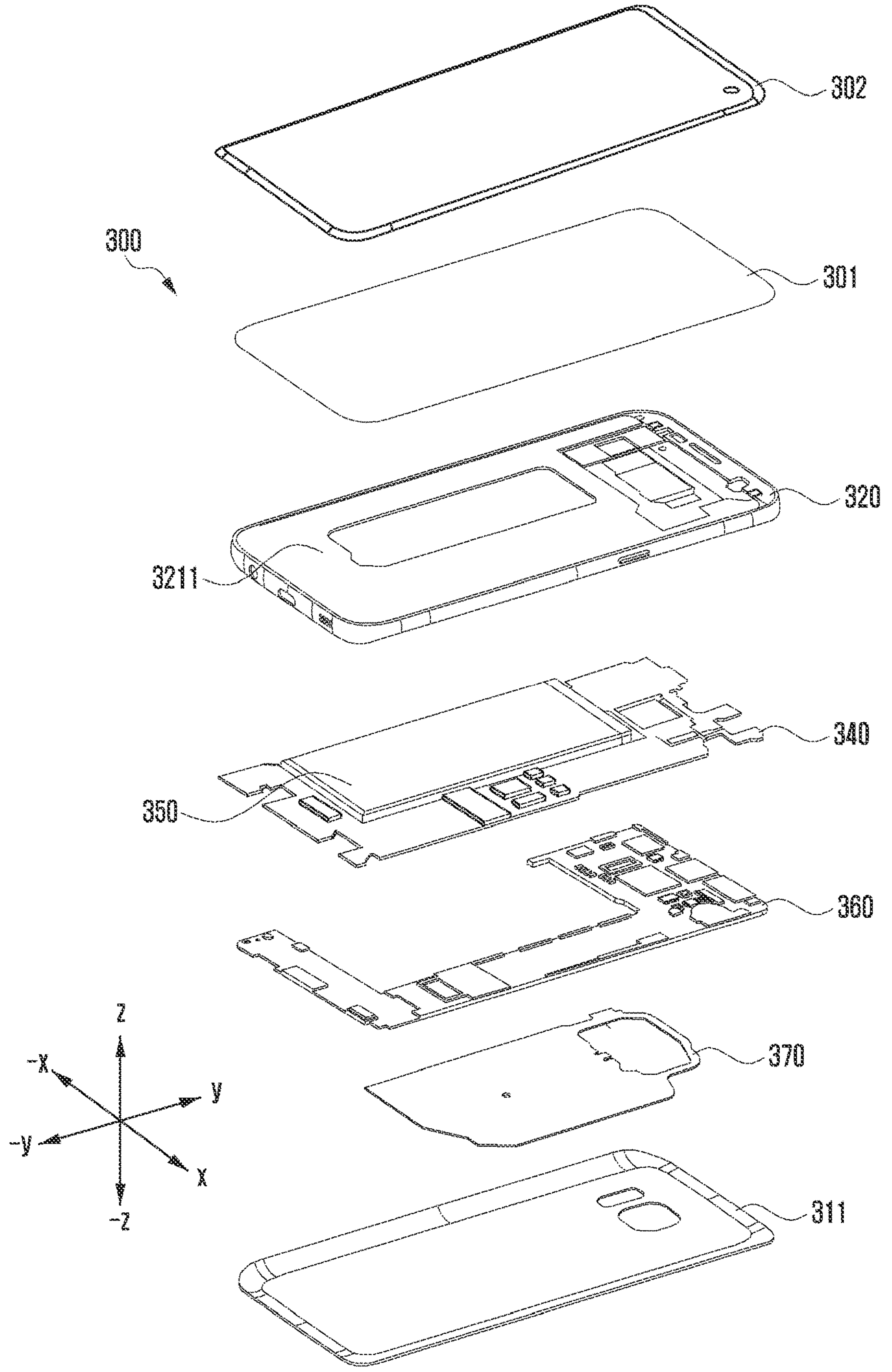
FIG. 3C is a deployed perspective view of a mobile electronic device according to an embodiment of the disclosure.

FIG. 3C is an exploded perspective view illustrating a mobile electronic device shown in FIG. 3A according to an embodiment of the disclosure.

Referring to FIG. 3C, a mobile electronic device 300 may include a lateral bezel structure 320, a first support member 3211 (e.g., a bracket), a front surface plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 3A or FIG. 3B, thus, descriptions thereof are omitted below.

The first support member 3211 is disposed inside the mobile electronic device 300 and may be connected to, or integrated with, the lateral bezel structure 320. The first support member 3211 is formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, memory, and/or an interface may be mounted. The processor includes, for example, one or more of a central processing unit (CPU), an application processor (AP), a graphics processing unit (GPU), an image signal processor (ISP), a sensor hub processor, or a communications processor (CP).

The memory includes, for example, one or more of volatile memory and non-volatile memory.

The interface includes, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and includes, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 includes, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4:
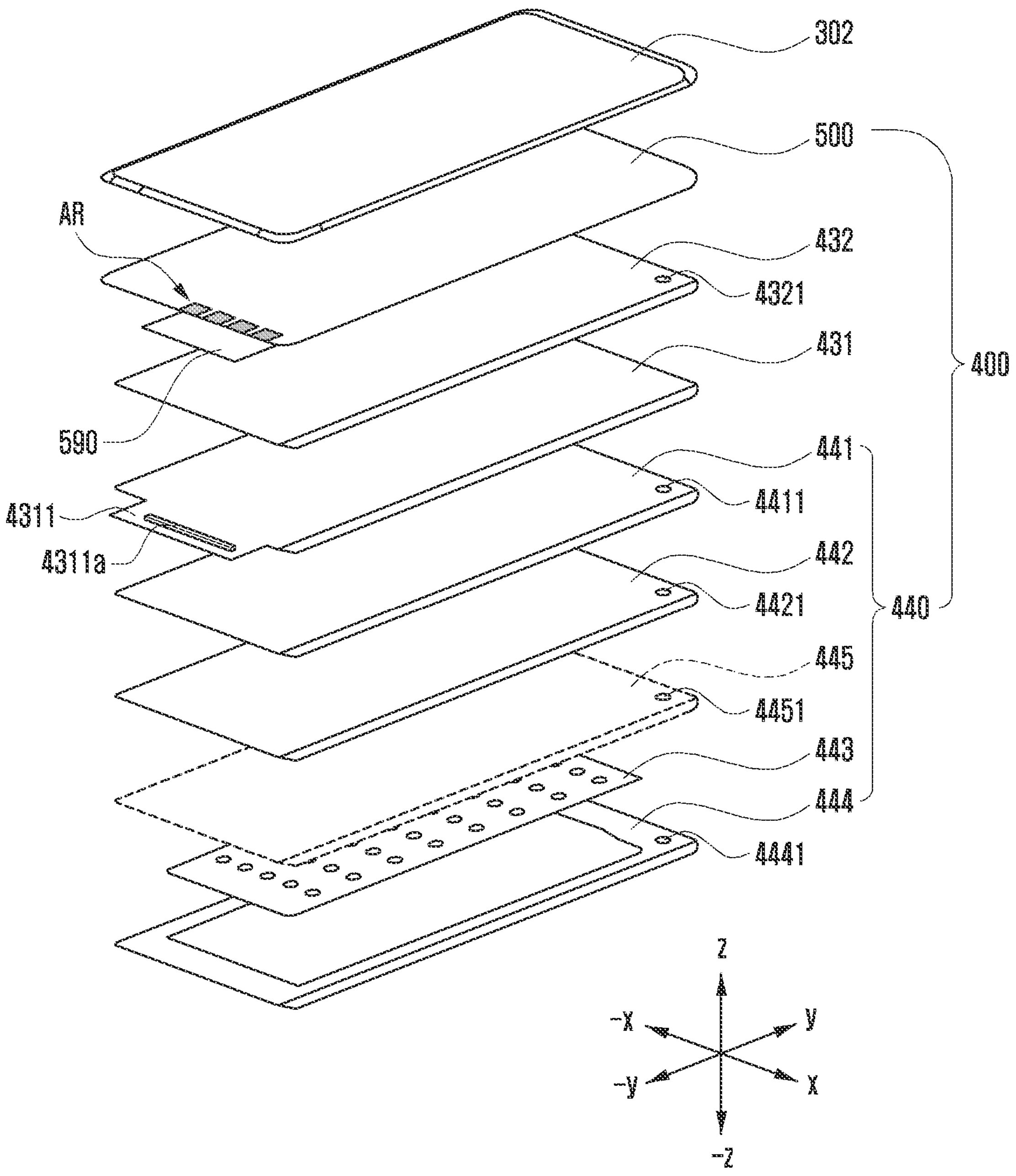
FIG. 4 is a deployed perspective view of a display according to an embodiment of the disclosure.

FIG. 4 is a deployed perspective view of a display according to an embodiment of the disclosure.

A display 400 in FIG. 4 may be at least partially similar to the display 301 in FIG. 3A or further include another embodiment of the display.

An antenna array AR in FIG. 4 may be at least partially similar to the antenna A in FIG. 3A or further include another embodiment of the antenna.

Referring to FIG. 4, the display 400 may include a dielectric sheet 500, a polarizing layer (polarizer (POL)) 432 (e.g., a polarizing film), a display panel 431, and/or at least one subsidiary material layer 440 that are stacked on the rear surface of the front surface plate 302 (e.g., a transparent cover, a front surface cover, a glass plate, a first cover member, or a cover member) by means of a bonding member. According to one embodiment, the bonding member may include optical clear adhesive (OCA), pressure sensitive adhesive (PSA), a thermally reactive bonding agent, a general bonding agent, or a double-sided tape. According to one embodiment, the display panel 431 and the POL 432 may be integrated. In any embodiment, the display 400 may further include a touch sensor disposed between the front surface plate 302 and the POL 432, disposed between the display panel 431 and the POL 432, or disposed in the display panel 431.

According to various embodiments, the display panel 431 may include a bending portion 4311 extending from the display panel 431 to at least a partial area of the rear surface (e.g., a −z-axis direction) of the display 400 and disposed to be folded. According to one embodiment, the bending portion 4311 may extend from the display panel 431 and include a control circuit 4311*a*. According to one embodiment, the control circuit 4311*a* may include a display driver IC (DDI) or a touch display driver IC (TDDI) disposed on the bending portion 4311. According to one embodiment, the control circuit 4311*a* may have a chip-on-panel or chip-on-plastic (COP) structure or a chip-on-film (COF) structure.

According to various embodiments, at least one subsidiary material layer 440 may include at least one polymer member 441 and 442 disposed on the rear surface (−Z-axis direction) of the display panel 431, at least one functional member 443 disposed on a rear surface (−Z-axis direction) of at least one polymer member 441 and 442, and/or a conductive member 444 disposed on a rear surface (−Z-axis direction) of at least one functional member 443. According to one embodiment, at least one polymer member 441 and 442 may include a light-blocking layer (i.e., one polymer member 441) (e.g., a black layer), which serves to remove bubbles, which may be formed between the display panel 431 and objects attached to the lower side of the display panel 431, and to block light generated in the display panel 431 or light introduced from the outside, and/or a buffer layer (i.e., one polymer member 442) disposed to mitigate an impact. According to one embodiment, at least one functional member 443 may include a heat dissipation sheet (e.g., a graphite sheet) for heat dissipation, a force touch FPCB, a fingerprint sensor FPCB, an antenna radiator for communication, a conductive/non-conductive tape, or an open cell sponge. According to one embodiment, the conductive member 444 is a metal sheet (e.g., a metal plate). The conductive member 444 may assist in reinforce the rigidity of the electronic device (e.g., the electronic device 300 in FIG. 3A), block surrounding noise, and disperse heat discharged from peripheral heat-radiating components. According to one embodiment, the conductive member 444 may include Cu, Al, Mg, SUS, or CLAD (e.g., a stack member in which SUS and Al are alternately disposed). As another embodiment, the display 400 may further include a detection member 445 configured to detect an input made by an electronic pen using electromagnetic induction. According to one embodiment, the detection member 445 may include a digitizer. According to one embodiment, the detection member 445 may be disposed between at least one polymer member 442 and the functional member 443. As another embodiment, the detection member 445 may also be disposed between the display panel 431 and at least one polymer member 441.

According to various embodiments, the subsidiary material layer 440 may include openings 4321, 4411, 4421, 4441, or 4451. For example, the openings 4321, 4411, 4421, 4441, or 4451 are used as an external environment detection route for the sensor module (e.g., the sensor module 304 in FIG. 3A) and/or the camera device (e.g., the camera device 305 in FIG. 3A) disposed in the internal space of the electronic device 300. In any embodiment, the POL 432 may be formed so that a position, which corresponds to the sensor module and/or the camera device, may be treated to be transparent or polarizing properties may be removed without the opening 4321. In any embodiment, the display panel 431 may be formed so that a transmittance rate at a position, which corresponds to the sensor module and/or the camera device, is higher than a transmittance rate of a peripheral area without the opening. In this case, an area of the display panel 431, which corresponds to the sensor module and/or the camera device, may exclude a pixel and/or a wiring structure or have a lower pixel density and/or a lower wiring density than the peripheral area.

According to various embodiments, the display 400 may include the dielectric sheet 500 disposed below the front surface plate 302. According to one embodiment, the dielectric sheet 500 may include the antenna array AR including conductive mesh patterns (e.g., the mesh patterns 510, 520, 530, and 540 in FIG. 5B) formed by a plurality of conductive lines (e.g., the conductive lines 515 in FIG. 5C). According to one embodiment, the antenna array AR may operate as an antenna (e.g., the antenna A in FIG. 3A) by being electrically connected to a wireless communication circuit (e.g., a wireless communication circuit 591 in FIG. 5B) (e.g., the wireless communication module 192 in FIG. 1) of the electronic device (e.g., the electronic device 300 in FIG. 3A) through a flexible printed circuit board (FPCB) 590 attached to the dielectric sheet 500. According to one embodiment, the wireless communication circuit (e.g., the wireless communication circuit 591 in FIG. 5B) may be configured to transmit or receive radio signals in a designated frequency band (e.g., a frequency band within a range of about 3 GHz to 300 GHz) through the antenna array AR. According to one embodiment, the FPCB 590 may be disposed to at least partially overlap the bending portion 4311 of the display panel 431 and disposed to be folded toward the rear surface of the display 400 together with the bending portion 4311. According to one embodiment, the FPCB 590 may be electrically connected to the substrate (e.g., the printed circuit board 340 in FIG. 3C) of the electronic device (e.g., the electronic device 300 in FIG. 3C) together with the bending portion 4311 of the display panel 431.

According to various embodiments, the antenna array AR may be disposed to form directional beams in the direction (Z-axis direction) in which the front surface plate 302 of the electronic device 300 is directed. According to one embodiment, the antenna array AR may be disposed at a position at which the antenna array AR overlaps an active area (display area) (e.g., a first area 501 in FIG. 5A) of the display panel 431 when viewed from above the front surface plate 302. In any embodiment, at least a part of the antenna array AR may also be disposed in an area that overlaps a non-active area (a non-display area)(e.g., a second area in FIG. 5A) of the display panel 431. In any embodiment, the antenna array AR, which includes the plurality of mesh patterns (e.g., the mesh patterns 510, 520, 530, and 540 in FIG. 5B), may be provided as a plurality of antenna arrays AR respectively disposed in various areas that overlap the display panel 431.

FIG. 5A is a configuration view of a dielectric sheet according to an embodiment of the disclosure.

FIG. 5B is an enlarged view of area 5*b* in FIG. 5A according to an embodiment of the disclosure.

Figure 5C:
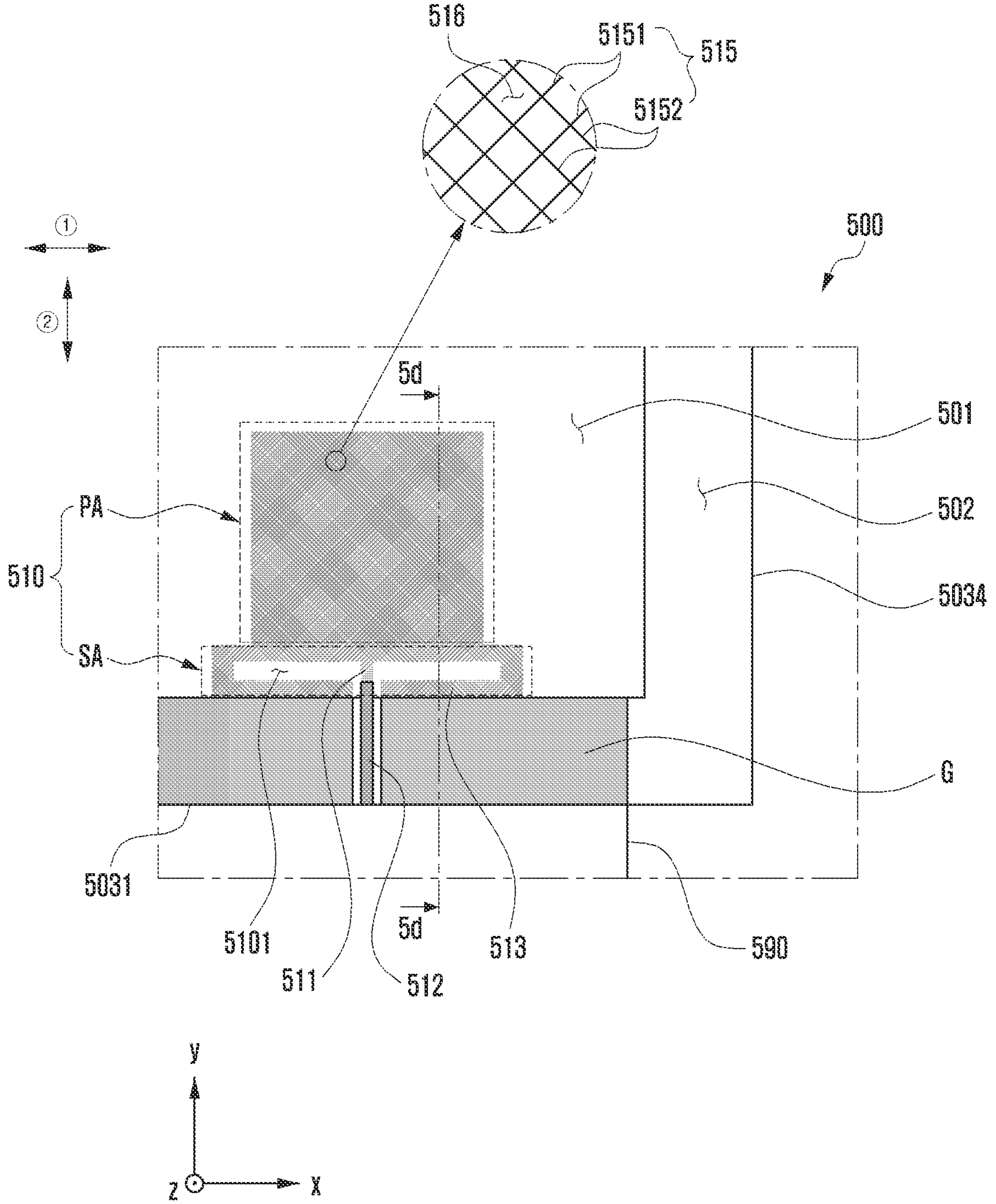
FIG. 5C is an enlarged view of area 5*c* in FIG. 5B according to an embodiment of the disclosure.

FIG. 5C is an enlarged view of area 5*c* in FIG. 5B according to embodiment of the disclosure.

The antenna array AR in FIG. 5A may be at least partially similar to the third antenna module 246 in FIG. 2 or further include another embodiment of the antenna.

Referring to FIG. 5A, the dielectric sheet 500 may be disposed below the front surface plate (e.g., the front surface plate 302 in FIG. 4) (e.g., the −Z-axis direction in FIG. 4) and disposed at a position at which the dielectric sheet 500 overlaps the display panel (e.g., the display panel 431 in FIG. 4) when viewed from above the front surface plate (e.g., the front surface plate 302 in FIG. 4). According to one embodiment, the dielectric sheet 500 may be made of a transparent polymer material. According to one embodiment, the dielectric sheet 500 may be formed in a rectangular shape. In still another example, the dielectric sheet 500 may be formed in a shape corresponding to a shape of the display panel (e.g., the display panel 431 in FIG. 4). According to one embodiment, the dielectric sheet 500 may include a first edge 5031 having a first length, a second edge 5032 extending in a vertical direction from the first edge 5031 and formed to be longer than the first length, a third edge 5033 extending from the second edge 5032 in parallel with the first edge 5031 and having the first length, and a fourth edge 5034 extending from the third edge 5033 to the first edge 5031 in parallel with the second edge 5032 and having a second length. According to one embodiment, when viewed from above the front surface plate (e.g., the front surface plate 302 in FIG. 4), the dielectric sheet 500 may include a first area disposed at a position at which the first area overlaps the active area (display area) of the display panel (e.g., the display panel 431 in FIG. 4), and a second area configured to overlap the non-active area (non-display area) of the display panel (e.g., the display panel 431 in FIG. 4).

According to various embodiments, the dielectric sheet 500 may be disposed in the first area and include the antenna array AR including the plurality of mesh patterns (e.g., the mesh patterns 510, 520, 530, and 540 in FIG. 5B) formed by the plurality of conductive lines (e.g., the conductive lines 515 in FIG. 5C). According to one embodiment, the plurality of mesh patterns (e.g., the mesh patterns 510, 520, 530, and 540 in FIG. 5B) may include a first mesh pattern (e.g., the first mesh pattern 510 in FIG. 5B), a second mesh pattern (e.g., the second mesh pattern 520 in FIG. 5B), a third mesh pattern (e.g., the third mesh pattern 530 in FIG. 5B), and/or a fourth mesh pattern (e.g., the fourth mesh pattern 540 in FIG. 5B) disposed to be spaced apart from one another at designated intervals. According to one embodiment, the antenna array AR may be disposed in the first area 501 and disposed in the vicinity of the first edge 5031 of the dielectric sheet 500. However, the disclosure is not limited thereto. The antenna array AR may be disposed in the vicinity of the second edge 5032, the third edge 5033, and/or the fourth edge 5034. In any embodiment, the antenna array may include two, three, or five or more mesh patterns. In any embodiment, the dielectric sheet 500 may be disposed in the first area 501 and include a single mesh pattern used as a single antenna.

According to various embodiments, the antenna array AR may each be electrically connected to the flexible printed circuit board (FPCB) 590 connected to the first edge 5031 of the dielectric sheet 500 so as to have a designated width and length. According to one embodiment, the antenna array AR may be electrically connected to the printed circuit board (e.g., the printed circuit board 340 in FIG. 3C) disposed in the internal space of the electronic device (e.g., the electronic device 300 in FIG. 3C) through the FPCB 590. According to one embodiment, the FPCB 590 may include the wireless communication circuit 591 (e.g., the third RFIC 226 in FIG. 2). In any embodiment, the wireless communication circuit 591 may be mounted on the printed circuit board (e.g., the printed circuit board 340 in FIG. 3C) of the electronic device (e.g., the electronic device 300 in FIG. 3C) and electrically connected to the antenna array AR through the FPCB 590.

According to various embodiments, the wireless communication circuit 591 may be configured to form directional beams in the direction (z-axis direction), in which the front surface plate (e.g., the front surface plate 302 in FIG. 4) is directed, through the antenna array AR. According to one embodiment, the wireless communication circuit 591 may be configured to transmit or receive radio signals in a frequency band within a range of about 3 GHz to about 300 GHz through the antenna array AR.

Referring to FIG. 5B, the antenna array A may include the plurality of mesh patterns 510, 520, 530, and 540 formed by the plurality of conductive lines (e.g., the conductive lines 515 in FIG. 5C) in the first area 501 in the vicinity of the first edge 5031 of the dielectric sheet 500. According to one embodiment, the plurality of mesh patterns 510, 520, 530, and 540 is each formed in a rectangular shape, as illustrated. However, the disclosure is not limited thereto. For example, the plurality of mesh patterns 510, 520, 530, and 540 each is formed in a rhombic shape, a circular shape, or an elliptical shape.

Hereinafter, a shape and an electric supply structure of the first mesh pattern 510 will be illustrated and described. However, it may be apparent to those skilled in the art that the shapes and electric supply structures of the second mesh pattern 520, the third mesh pattern 530, and the fourth mesh pattern 540 are also substantially identical to those of the first mesh pattern 510.

Referring to FIG. 5C, the first mesh pattern 510 may be formed in a way in which the plurality of conductive lines 515 (e.g., conductive patterns or conductive wiring structures) intersect one another. According to one embodiment, the plurality of conductive lines 515 may include a plurality of first conductive lines 5151 disposed at designated intervals in a designated direction, and a plurality of second conductive lines 5152 intersecting the plurality of first conductive lines 5151 and disposed at designated intervals. According to one embodiment, intersection spaces 516, which are defined by the plurality of first conductive lines 5151 and the plurality of second conductive lines 5152, may each have a rectangular shape or a rhombic shape. According to one embodiment, the arrangement intervals of the plurality of first conductive lines 5151 and the plurality of second conductive lines 5152 may be determined depending on the visibility indicating that the display panel (e.g., the display panel 431 in FIG. 4) disposed below the dielectric sheet 500 is visible from the outside.

According to various embodiments, the first mesh pattern 510 may include a patch antenna area PA and a slot antenna area SA extending from the patch antenna area PA and electrically connected to a ground area G. According to one embodiment, the slot antenna area SA may include a slot 5101 having a length and formed by excluding the plurality of conductive lines 515. According to one embodiment, the slot 5101 may be formed to have a length in a first direction (direction ①) in which the plurality of mesh patterns (e.g., the mesh patterns 510, 520, 530, and 540 in FIG. 5B) of the antenna array AR is arranged. According to one embodiment, the radiation performance (e.g., gain) of the antenna array AR may be determined depending on a length, a width, or an arrangement position of the slot 5101. According to one embodiment, the first mesh pattern 510 may be electrically connected to the ground area G through a ground connection portion 513, which is an end of the first mesh pattern 510, in the slot antenna area SA. According to one embodiment, the slot 5101 may be disposed between the patch antenna area PA of the first mesh pattern 510 and the ground connection portion 513. According to one embodiment, at least a part of the ground area G may be disposed through a second area 502 of the dielectric sheet 500. In any embodiment, the ground area G may be disposed on the FPCB 590 connected to the second area 502 of the dielectric sheet 500. For example, the ground area G is electrically connected to the ground (e.g., common ground) of the printed circuit board (e.g., the printed circuit board 340 in FIG. 3C) of the electronic device (e.g., the electronic device 300 in FIG. 3C) through the FPCB 590.

According to various embodiments, the first mesh pattern 510 may include at least one electric supply line 512 (transmission line) (e.g., an electric supply pad) electrically connected to the patch antenna area PA while traversing the ground area G and the slot 5101 in a second direction (direction ②) intersecting (e.g., perpendicular to) the first direction (direction ①). According to one embodiment, at least one electric supply line 512 may be kept in a state of being insulated or spaced apart from the ground area G. According to one embodiment, at least one electric supply line 512 may include a conductive pattern (conductive pattern) or a conductive pad (conductive pad) having a designated length and width. According to one embodiment, at least one electric supply line 512 may be electrically connected to a connecting portion 511 protruding in a direction toward the ground area G from the patch antenna area PA of the first mesh pattern 510 and formed by the plurality of conductive lines 515. According to one embodiment, the connecting portion 511 may extend to the vicinity of the ground area G so as not to be visible from the outside. According to one embodiment, a portion where the connecting portion 511 and at least one electric supply line 512 are connected may be positioned in the vicinity of the slot 5101 or disposed at a position at least partially overlapping the slot 5101. According to one embodiment, when viewed from above the dielectric sheet 500, at least one electric supply line 512 may be disposed to a position overlapping the non-active area of the display panel (e.g., the display panel 431 in FIG. 4), and the connecting portion 511 may be disposed to a position overlapping the active area of the display panel (e.g., the display panel 431 in FIG. 4). For example, the connecting portion 511 and at least one electric supply line 512 are electrically connected at a boundary portion between the first area 501 and the second area 502 of the dielectric sheet 500. In any embodiment, at least one electric supply line 512 may include a pair of electric supply lines disposed to be spaced apart from one another at designated intervals and connected to the patch antenna area PA while traversing the slot 5101. In this case, the antenna array AR may operate as a dual-polarized wave antenna array.

According to various embodiments, when an electric current is applied through the electric supply line 512, a difference in conductivity may occur at the portion where the first mesh pattern 510 formed by the conductive lines 515 and the electric supply line 512 having a solid shape (e.g., a conductive pad shape) are connected, and resistance increases, such that the electric current decreases, which may degrade the radiation performance of the antenna array AR. According to an embodiment of the disclosure, the slot 5101, which is disposed in the vicinity of the electric supply line 512 and the connecting portion 511, operates as a slot antenna through the ground area G and reduces resistance at the portion where the connecting portion 511 and the electric supply line 512 are connected, which may assist in improving the radiation performance (e.g., gain).

Figure 5D:
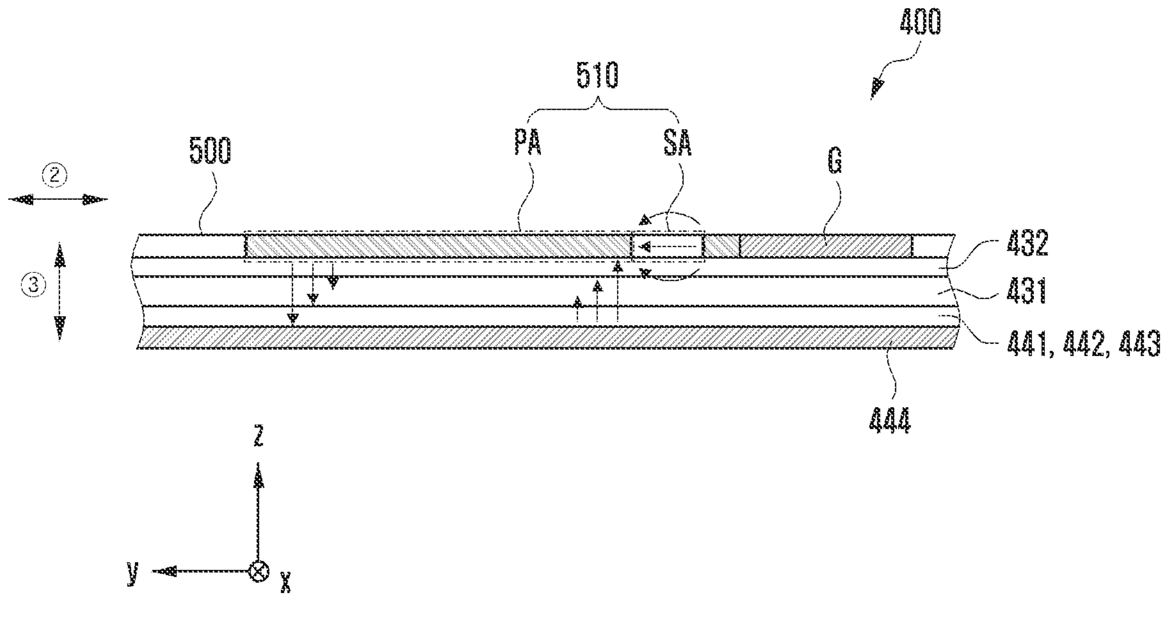
FIG. 5D is a partially cross-sectional view of a display of a dielectric sheet according to an embodiment of the disclosure.

FIG. 5D is a partially cross-sectional view of a display of a dielectric sheet according to an embodiment of the disclosure.

The dielectric sheet in FIG. 5D may include a partially cross-sectional view when viewed along line 5*d*-5*d* in FIG. 5C.

Referring to FIG. 5D, the display 400 (e.g., the display 400 in FIG. 4) may include the dielectric sheet 500, the polarizing layer (polarizer (POL)) 432 (e.g., a polarizing film), the display panel 431, and/or at least one subsidiary material layer (e.g., the subsidiary material layer 440 in FIG. 4) that are stacked on the rear surface of the front surface plate (e.g., the front surface plate 302 in FIG. 4) by a bonding member. According to one embodiment, the subsidiary material layer may include at least one polymer member 441 and 442 disposed on the rear surface (−Z-axis direction) of the display panel 431, at least one functional member 443 disposed on the rear surface (−Z-axis direction) of at least one polymer member 441 and 442, and/or the conductive member 444 disposed on the rear surface (−Z-axis direction) of at least one functional member 443.

According to various embodiments, the dielectric sheet 500 may include the first mesh pattern 510 formed by the plurality of conductive lines (e.g., the plurality of conductive lines 515 in FIG. 5C). According to one embodiment, the first mesh pattern 510 may include the patch antenna area PA and the slot antenna area SA extending from the patch antenna area PA and electrically connected to the ground area G. According to one embodiment, the slot antenna area SA may include the slot 5101 having a length and formed by excluding the plurality of conductive lines 515. In this case, the first mesh pattern 510 may form an E-field in the horizontal direction (e.g., direction ②) through the ground area G in the slot antenna area SA. According to one embodiment, the first mesh pattern 520 may form an E-field in the vertical direction (e.g., direction ③) through the conductive member 444 of the display 400 in the patch antenna area PA. Although not illustrated, the remaining mesh patterns (e.g., the mesh patterns 520, 530, and 540 in FIG. 5C) may also form E-fields in substantially the same way.

Figure 6:
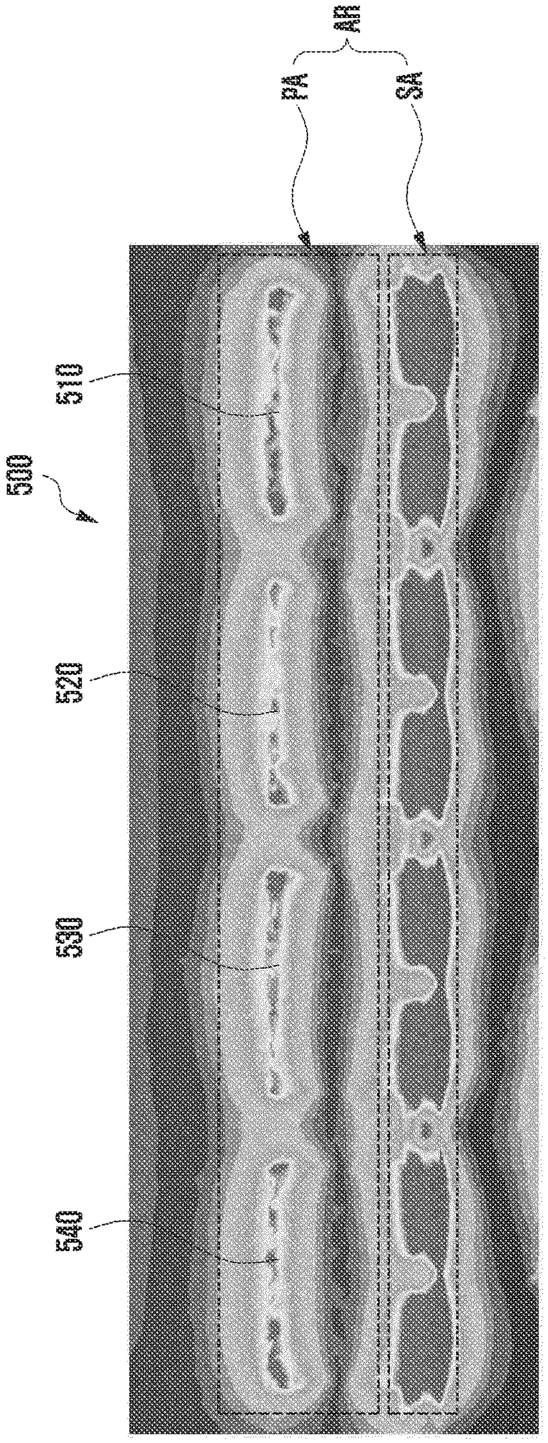
FIG. 6 is a view illustrating an electric field distribution (power distribution) for each area of mesh patterns according to an embodiment of the disclosure.

FIG. 6 is a view illustrating an electric field distribution (power distribution) for each area of mesh patterns according to an embodiment of the disclosure.

Referring to FIG. 6, it may be seen that when the electric current is applied to the antenna array AR through the electric supply line 512, electric fields (power distributions) are generated in the patch antenna area PA and the slot antenna area SA. This may mean that resistance decreases at the portion where the connecting portion 511 and the electric supply line 512 are connected, which may assist in improving the gain of the antenna array AR.

Figure 7A:
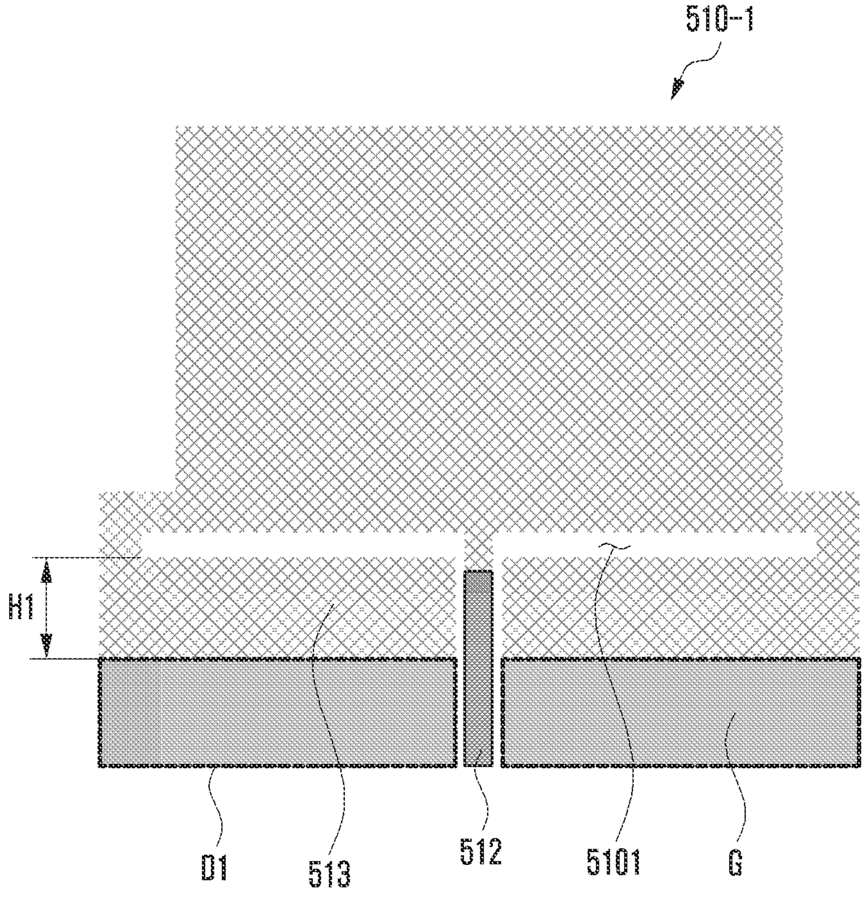
FIGS. 7A and 7B are configuration views of mesh patterns for comparing distances between a slot and a ground area according to various embodiments of the disclosure.
Figure 7B:
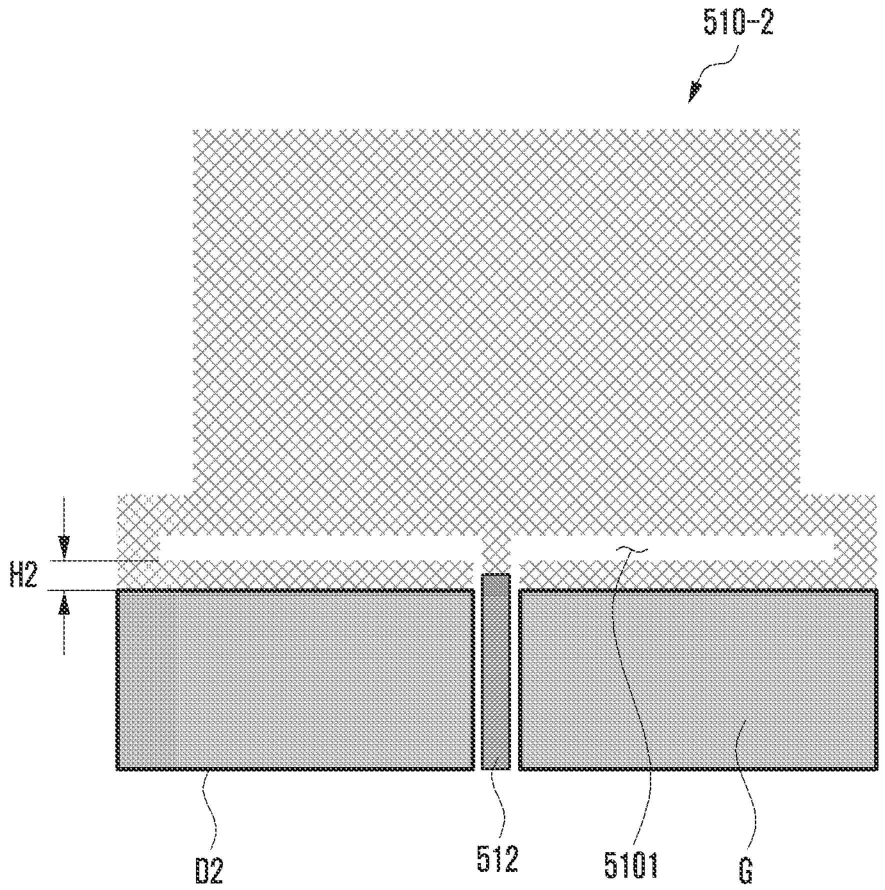

FIGS. 7A and 7B are configuration views of mesh patterns for comparing distances between a slot and a ground area according to various embodiments of the disclosure.

Figure 8:
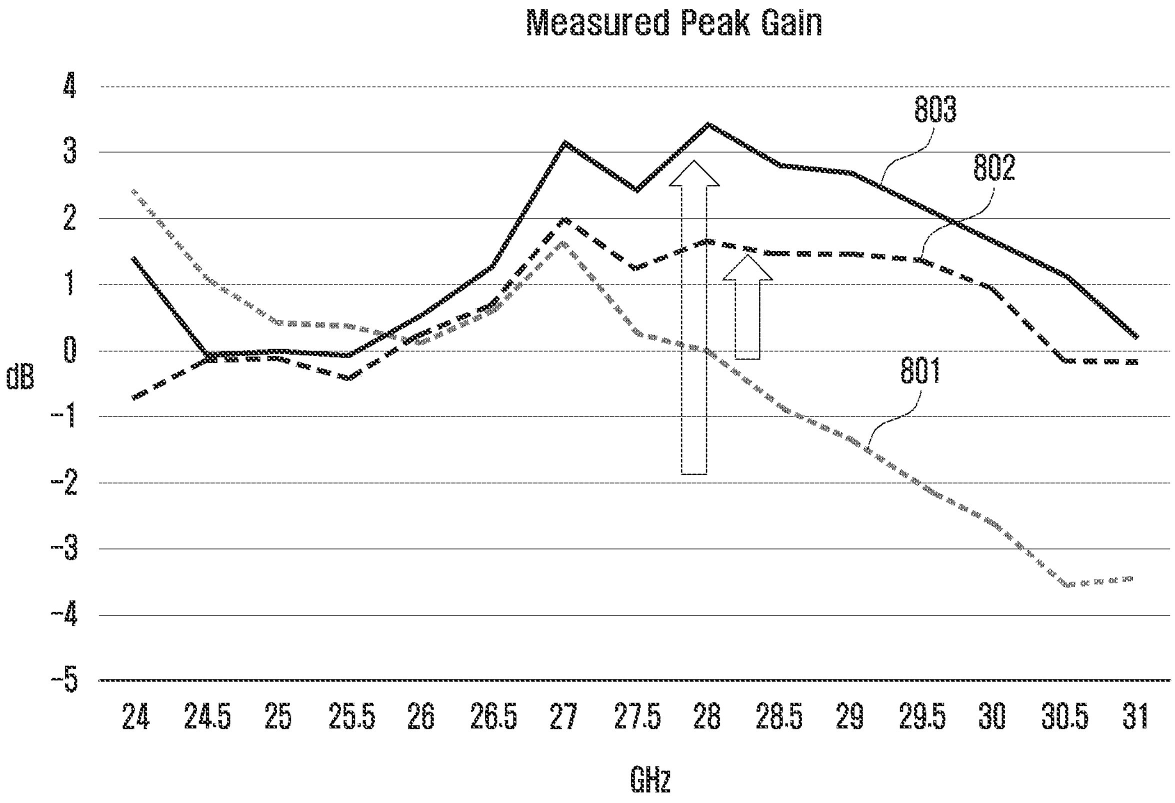
FIG. 8 is a graph for comparing radiation performance of the antenna by means of the mesh patterns in FIGS. 7A and 7B according to an embodiment of the disclosure.

FIG. 8 is a graph for comparing radiation performance (e.g., gain) of an antenna by means of the mesh patterns in FIGS. 7A and 7B according to an embodiment of the disclosure.

Referring to FIGS. FIGS. 7A and 7B, mesh patterns 510-1 and 510-2 may be at least partially similar to the mesh pattern 510 in FIG. 5C or further include another embodiment of the mesh pattern.

A mesh pattern 510-1 in FIG. 7A may include the slot 5101 having a first area D1 and spaced apart from the ground area G by a first distance H1. A mesh pattern 510-2 in FIG. 7B may include the slot 5101 having a second area D2 larger than the first area D1 and spaced apart from the ground area G by a second distance H2 shorter than the first distance H1.

Referring to FIG. 8, it may be seen that in an operating frequency band (e.g., 28 GHz band), the antennas having the slots 5101 included in the mesh pattern 510-1 and 510-2 (graph 802 and graph 803) are better in radiation performance (e.g., gain) than the antenna including no slot (graph 801). In addition, it may be seen that the radiation performance (graph 803) of the antenna having the configuration in FIG. 7B is better than the radiation performance (graph 802) of the antenna having the configuration in FIG. 7A. This may mean that the radiation performance becomes excellent when the distance from the ground area G to the slot 5101 is short or the area of the ground area G is relatively large even though the slot 5101 is formed in the mesh pattern.

Figure 9:
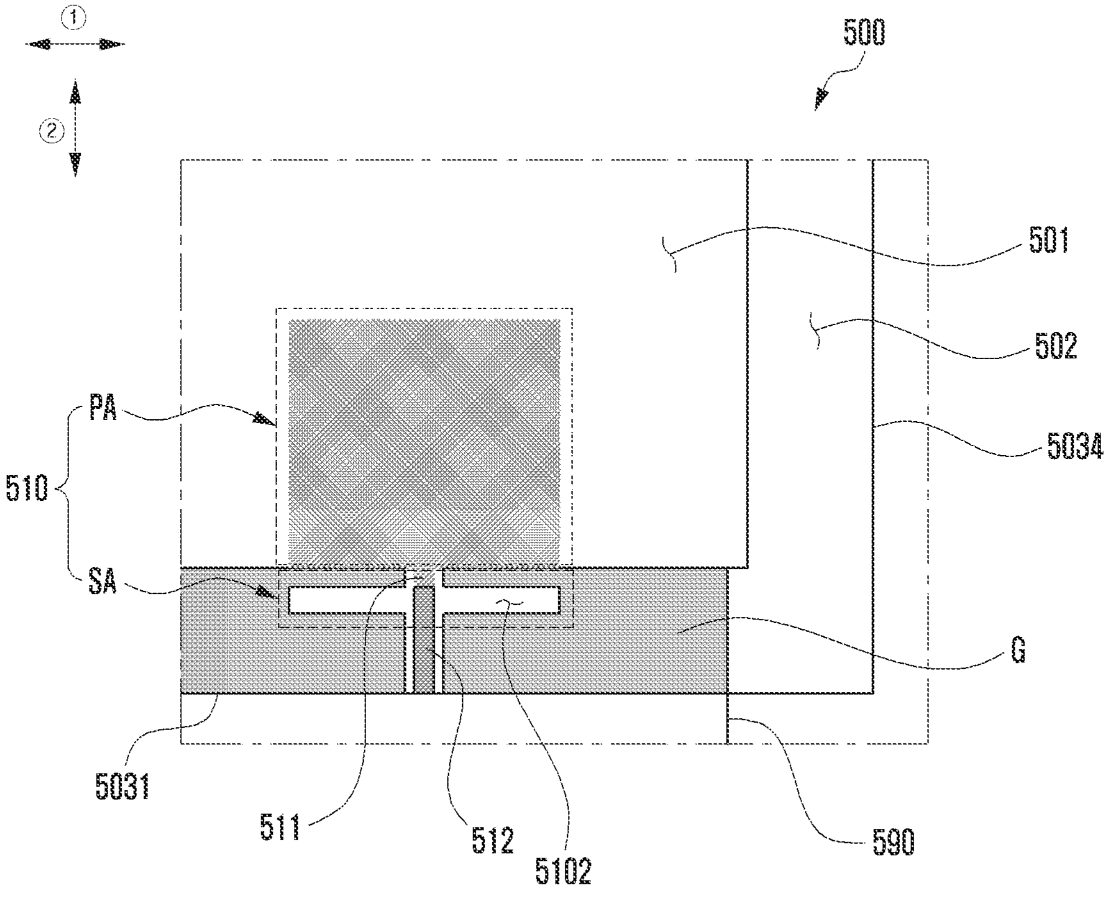
FIG. 9 is a configuration view of a part of a dielectric sheet including a mesh pattern including a slot in the ground according to an embodiment of the disclosure.

FIG. 9 is a configuration view of a part of a dielectric sheet including a mesh pattern including the slot in the ground according to an embodiment of the disclosure.

In the description of a structure of the mesh pattern 510' in FIG. 9, the constituent elements substantially identical to the structure of the mesh pattern 510 in FIG. 5C will be designated by the same reference numerals, and a detailed description thereof will be omitted.

Referring to FIG. 9, a slot 5102 for the slot antenna area SA may also be formed in the ground area G. In this case, the slot 5102 may have a length corresponding to the mesh pattern 510' in the first direction (direction ①). According to one embodiment, the electric supply line 512 may be electrically connected to the patch antenna area PA of the mesh pattern 510' while traversing the ground area G and the slot 5102. According to one embodiment, the patch antenna area PA of the first mesh pattern 510' may be electrically connected to the ground area G. In any embodiment, a boundary portion between the ground area G and the patch antenna area PA of the mesh pattern 510' may be disposed on a boundary portion between the first area 501 and the second area 502 of the dielectric sheet 500.

Figure 10:
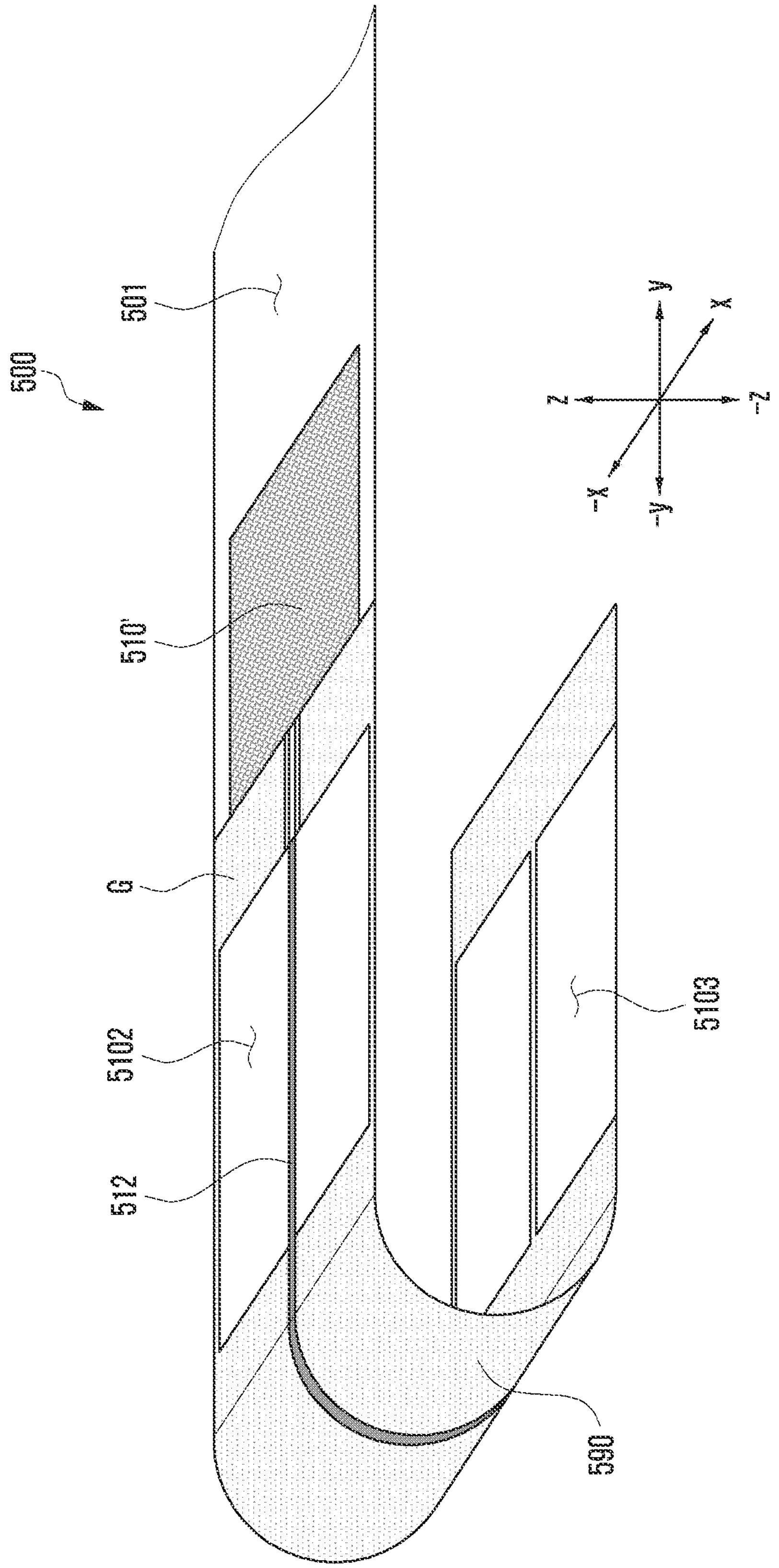
FIG. 10 is a perspective view illustrating a dielectric sheet and illustrating a configuration in which slots are disposed in accordance with a bending structure of an flexible printed circuit board (FPCB) according to an embodiment of the disclosure.

FIG. 10 is a perspective view illustrating a dielectric sheet and illustrating a configuration in which slots are disposed in accordance with a bending structure of an FPCB according to an embodiment of the disclosure.

Referring to FIG. 10, the dielectric sheet 500 may include the FPCB 590 extending outward from a position corresponding to the mesh pattern 510'(e.g., the mesh pattern 510' in FIG. 9). According to one embodiment, the FPCB 590 may include the ground area G and be bent toward the rear surface of the display (e.g., the display 400 in FIG. 4) together with the bending portion (e.g., the bending portion 4311 in FIG. 4) of the display panel (e.g., the display panel 431 in FIG. 4). According to one embodiment, the mesh pattern 510' may include the electric supply line 512 disposed while traversing the ground area G of the FPCB 590. According to one embodiment, the electric supply line 512 may be disposed while traversing a first slot 5102 (e.g., the slot 5102 in FIG. 9) formed in the ground area G and a second slot 5103 disposed to be spaced apart from the first slot 5102. According to one embodiment, the first slot 5102 and the second slot 5103 may be disposed at positions overlapping each other in a state in which the FPCB 590 is bent when viewed from above the dielectric sheet 500. This is to define the slot antenna area SA disposed adjacent to the patch antenna area PA and configured to operate so that the first slot 5102 and the second slot 5103 appear to be a single slot in order to improve the radiation performance of the antenna formed by the mesh pattern 510'. In any embodiment, in case that the ground area G is formed in the dielectric sheet 500, the first slot 5102 or the first slot 5102 and the second slot 5103 may also be formed through the second area (e.g., the second area 502 in FIG. 9) of the dielectric sheet 500.

According to various embodiments, an electronic device (e.g., the electronic device 300 in FIG. 3A) may include a housing (e.g., the housing 310 in FIG. 3A), a display panel (e.g., the display panel 431 in FIG. 4) disposed in an internal space of the housing so as to be visible from the outside through at least a part of the housing, a dielectric sheet (e.g., the dielectric sheet 500 in FIG. 5C) disposed between the display panel and the housing and at least partially including a ground area (e.g., the ground area G in FIG. 5C), at least one mesh pattern (e.g., the mesh pattern 510 in FIG. 5C) disposed to be at least partially electrically connected to the ground area and formed in a patch shape by a plurality of conductive lines (e.g., the conductive lines 515 in FIG. 5C), and a wireless communication circuit (e.g., the wireless communication circuit 591 in FIG. 5C) configured to transmit or receive a radio signal in a designated frequency band through the at least one mesh pattern, in which at least a part of the at least one mesh pattern or at least a part of the ground area includes a slot (e.g., the slot 5101 in FIG. 5C) formed to have a length in a first direction (e.g., the first direction (direction ①) in FIG. 5C), and in which the at least one mesh pattern is electrically connected to the wireless communication circuit through at least one electric supply line (e.g., the electric supply line 512 in FIG. 5C) disposed while traversing the ground area and at least one slot in a second direction (e.g., the first direction (direction ②) in FIG. 5C) intersecting the first direction.

According to the various embodiments, the at least one mesh pattern may be formed by a plurality of first conductive lines disposed at designated intervals and a plurality of second conductive lines intersecting the plurality of first conductive lines and disposed at designated intervals.

According to the various embodiments, the slot may be formed by excluding the plurality of conductive lines.

According to the various embodiments, a portion where the at least one electric supply line and the at least one mesh pattern are connected may be disposed in the slot.

According to the various embodiments, the dielectric sheet may be disposed to have a size overlapping the display panel when viewed from above the display panel.

According to the various embodiments, the at least one mesh pattern may be disposed at a position overlapping an active area of the display panel when viewed from above the display panel.

According to the various embodiments, the ground area may be disposed at a position overlapping a non-active area of the display panel when viewed from above the display panel.

According to the various embodiments, the electronic device may include an flexible printed circuit board (FPCB) attached to the dielectric sheet, in which the at least one electric supply line is electrically connected to the FPCB.

According to the various embodiments, the wireless communication circuit may be disposed on the FPCB.

According to the various embodiments, the ground area may be disposed on the FPCB attached to overlap the dielectric sheet.

According to the various embodiments, radiation performance of the at least one mesh pattern may be determined depending on a distance between the slot and the ground area.

According to the various embodiments, the at least one mesh pattern may include two or more mesh patterns disposed at designated intervals in the first direction.

According to the various embodiments, the at least one electric supply line may include a pair of electric supply lines disposed at a designated interval to traverse the slot and the ground area.

According to the various embodiments, the wireless communication circuit may be configured to form directional beams in a direction, in which the display panel is directed, through the at least one mesh pattern.

According to the various embodiments, the designated frequency band may include a frequency band within a range of 3 gigahertz (GHz) to 300 GHz.

According to various embodiments, the antenna may include a dielectric sheet at least partially including a ground area, at least one mesh pattern disposed to be at least partially electrically connected to the ground area and formed in a patch shape by a plurality of conductive lines, a slot formed in at least a part of the at least one mesh pattern or at least a part of the ground area and having a length in a first direction, and at least one electric supply line disposed while traversing the ground area and the at least one slot in a second direction perpendicular to the first direction.

According to the various embodiments, the at least one mesh pattern may be formed by a plurality of first conductive lines disposed at designated intervals and a plurality of second conductive lines intersecting the plurality of first conductive lines and disposed at designated intervals.

According to the various embodiments, the slot may be formed by excluding the plurality of conductive lines.

According to the various embodiments, a portion where the at least one electric supply line and the at least one mesh pattern are connected may be disposed in the slot.

According to various embodiments, the electronic device may further include an FPCB attached to the dielectric sheet and including a wireless communication circuit electrically connected to the at least one electric supply line, in which the wireless communication circuit is configured to form directional beams in a designated frequency band through the at least one mesh pattern.

While the disclosure has been shown and described with reference to various embodiment thereof, it will be understood by those skilled in the art that various changes in form and details may be made therein without departing from the spirit and scope of the disclosure as defined by the appended claims and their equivalents.

What is claimed is:

1. An electronic device comprising:

a housing;

a display panel disposed in an internal space of the housing so as to be visible from outside the housing through at least a part of the housing;

a dielectric sheet disposed between the display panel and the housing and at least partially including a ground area;

at least one mesh pattern disposed to be at least partially electrically connected to the ground area at the dielectric sheet and formed by a plurality of conductive lines; and a wireless communication circuit configured to transmit or receive a radio signal in a designated frequency band through the at least one mesh pattern, wherein the at least one mesh pattern includes a patch antenna area formed in a patch shape and a slot antenna area extending from the patch antenna area, the slot antenna area including a slot formed to have a length in a first direction and is at least partially electrically connected to the ground area, and wherein the at least one mesh pattern is electrically connected to the wireless communication circuit through at least one electric supply line disposed while traversing the ground area and the slot in a second direction intersecting the first direction.

2. The electronic device of claim 1, wherein the at least one mesh pattern is formed by:

a plurality of first conductive lines disposed at designated intervals; and a plurality of second conductive lines intersecting the plurality of first conductive lines and disposed at designated intervals.

3. The electronic device of claim 1, wherein the slot is formed by excluding the plurality of conductive lines.

4. The electronic device of claim 1, wherein a portion where the at least one electric supply line and the at least one mesh pattern are connected is disposed in the slot.

5. The electronic device of claim 1, wherein the dielectric sheet is disposed to have a size overlapping the display panel when viewed from above the display panel.

6. The electronic device of claim 5, wherein the at least one mesh pattern is disposed at a position overlapping an active area of the display panel when viewed from above the display panel.

7. The electronic device of claim 6, wherein the ground area is disposed at a position overlapping a non-active area of the display panel when viewed from above the display panel.

8. The electronic device of claim 1, comprising:

an flexible printed circuit board (FPCB) attached to the dielectric sheet, wherein the at least one electric supply line is electrically connected to the FPCB.

9. The electronic device of claim 8, wherein the wireless communication circuit is disposed on the FPCB.

10. The electronic device of claim 8, wherein the ground area is disposed on the FPCB attached to overlap the dielectric sheet.

11. The electronic device of claim 1, wherein radiation performance of the at least one mesh pattern is determined depending on a distance between the slot and the ground area.

12. The electronic device of claim 1, wherein the at least one mesh pattern comprises two or more mesh patterns disposed at designated intervals in the first direction.

13. The electronic device of claim 1, wherein the at least one electric supply line comprises a pair of electric supply lines disposed at a designated interval to traverse the slot and the ground area.

14. The electronic device of claim 1, wherein the wireless communication circuit is configured to form directional beams in a direction, in which the display panel is directed, through the at least one mesh pattern.

15. The electronic device of claim 1, wherein the designated frequency band includes a frequency band within a range of 3 gigahertz (GHz) to 300 GHz.

16. An antenna comprising:

a dielectric sheet at least partially including a ground area;

at least one mesh pattern disposed to be at least partially electrically connected to the ground area at the dielectric sheet and formed by a plurality of conductive lines, the at least one mesh pattern including a patch antenna area formed in a patch shape and a slot antenna area extending from the patch antenna area, the slot antenna area being at least partially electrically connected to the ground area;

a slot formed to have a length in a first direction in the slot antenna area; and at least one electric supply line disposed while traversing the ground area and the slot in a second direction perpendicular to the first direction.

17. The antenna of claim 16, wherein the at least one mesh pattern is formed by a plurality of first conductive lines disposed at designated intervals and a plurality of second conductive lines intersecting the plurality of first conductive lines and disposed at designated intervals.

18. The antenna of claim 16, wherein the slot is formed by excluding the plurality of conductive lines.

19. The antenna of claim 16, wherein a connection portion of the at least one electric supply line and the at least one mesh pattern is disposed in the slot.

20. The antenna of claim 16, comprising:

a FPCB attached to the dielectric sheet and including a wireless communication circuit electrically connected to the at least one electric supply line, in which the wireless communication circuit is configured to form directional beams in a designated frequency band through the at least one mesh pattern, wherein the wireless communication circuit is configured to form directional beams in a direction, in which a display panel is directed, through the at least one mesh pattern.

* * * * *